Sept. 14, 1965   YOSHIHIRO MATSUI   3,205,647
RING DEVICE FOR USE IN SPINNING MACHINE
Original Filed Feb. 16, 1961   3 Sheets-Sheet 1
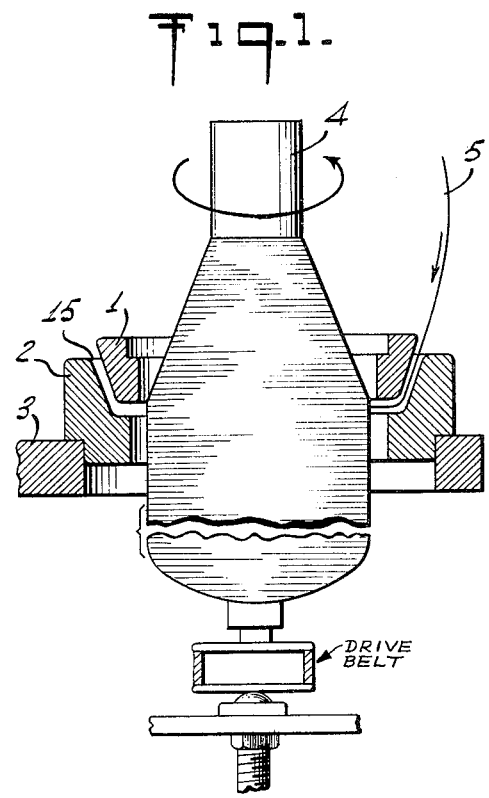
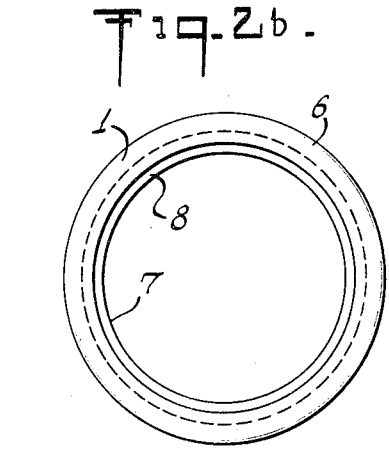
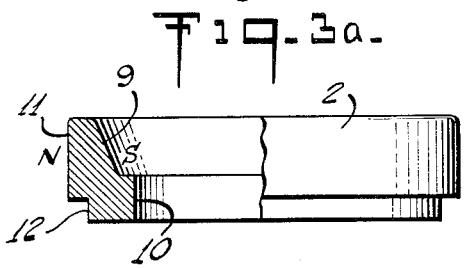
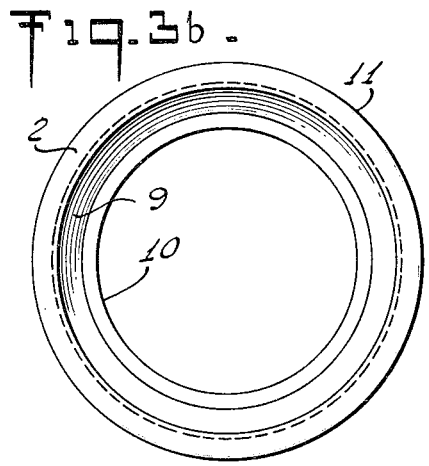
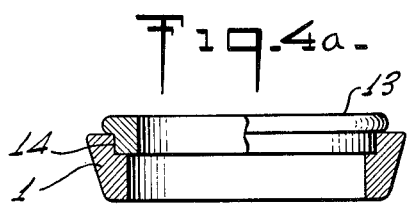
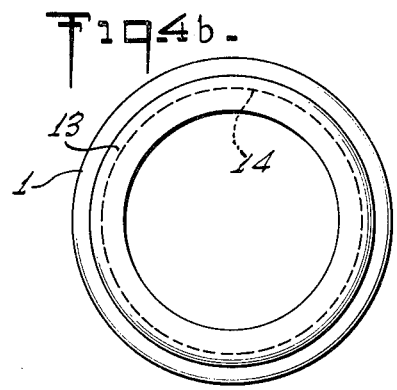
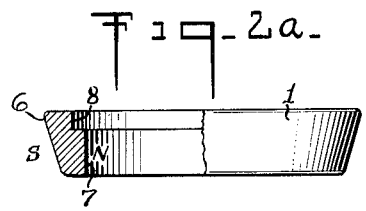
INVENTOR
Yoshihiro Matsui
BY
ATTORNEY

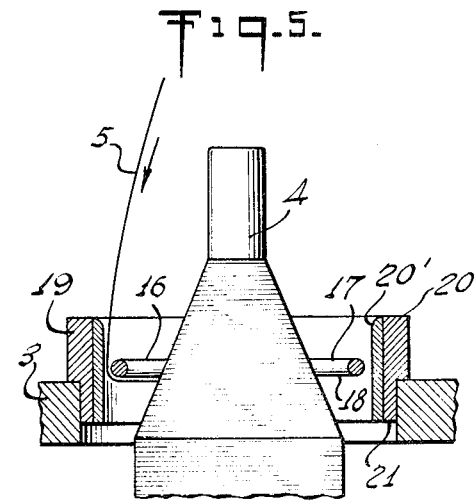
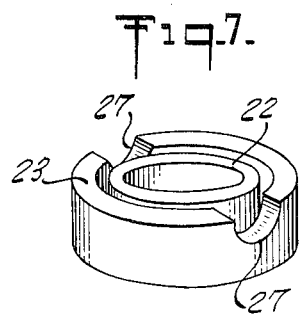
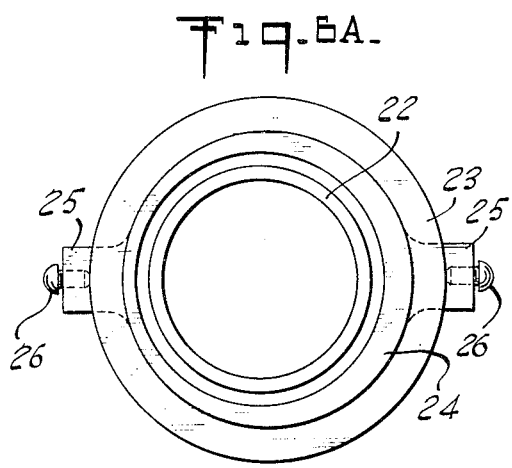
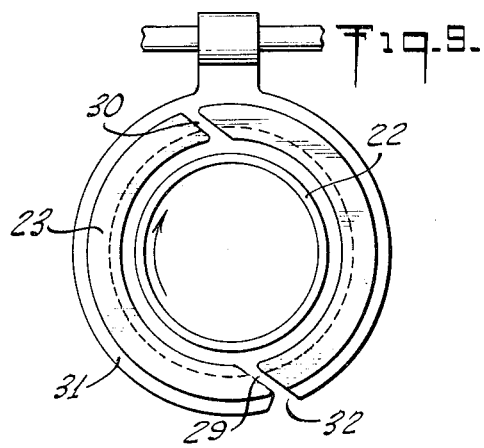
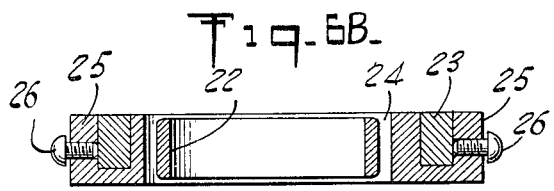
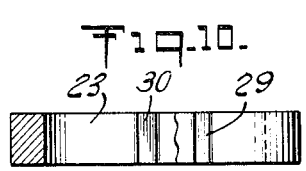
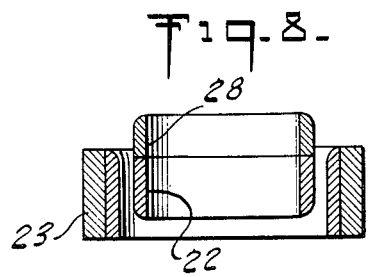

Sept. 14, 1965 YOSHIHIRO MATSUI 3,205,647
RING DEVICE FOR USE IN SPINNING MACHINE
Original Filed Feb. 16, 1961 3 Sheets-Sheet 3
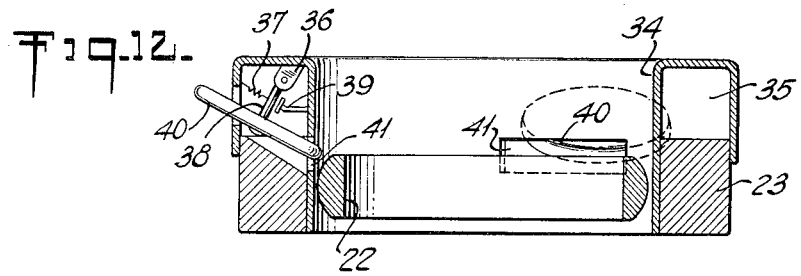
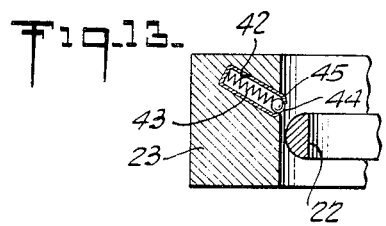
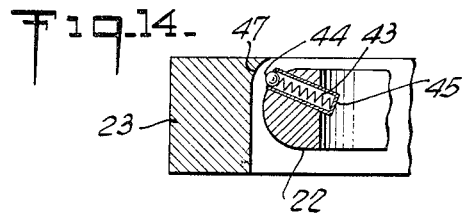
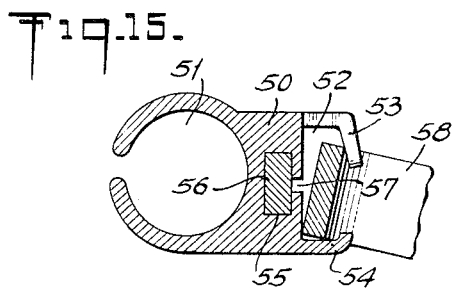
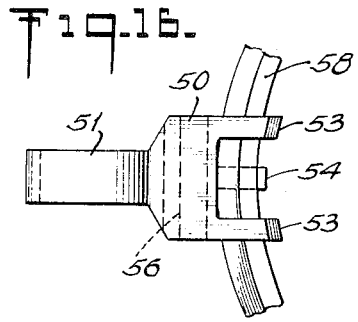
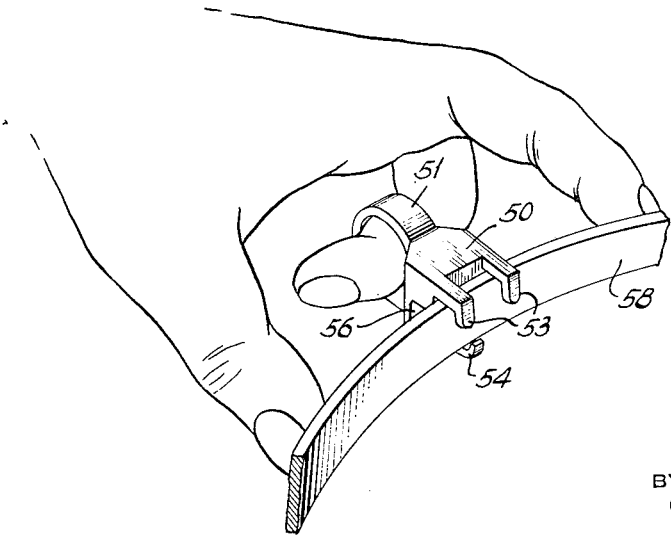
INVENTOR
Yoshihiro Matsui
BY
ATTORNEY United States Patent Office 3,205,647
Patented Sept. 14, 1965

3,205,647
RING DEVICE FOR USE IN SPINNING MACHINE
Yoshihiro Matsui, Nada-ku, Kobe-shi, Japan, assignor to Nippon Keori Kabushiki Kaisha, Kobe-shi, Japan, a company of Japan
Original application Feb. 16, 1961, Ser. No. 89,718, now Patent No. 3,122,876, dated Mar. 3, 1964. Divided and this application Oct. 15, 1963, Ser. No. 317,105
Claims priority, application Japan, July 18, 1960, 35/31,965, 35/31,966, 35/31,967, 35/31,968, 35/31,969; Aug. 26, 1960, 35/36,220
8 Claims. (Cl. 57—124)

This application is a division of application Serial No. 89,718, filed February 16, 1961, now U.S. Patent No. 3,122,876 entitled Magnetic Spinning Ring.

This invention relates to spinning and more specifically to improved apparatus for twisting yarn and winding it on a bobbin or spool.

Spinning apparatus for twisting and winding yarn has been known for some time. This apparatus generally consists of a spindle which supports the yarn bobbin, a ring surrounding the bobbin and a C-shaped traveller supported by the ring and capable of travelling about its circumference. With this structure the yarn which is supplied from an upper portion of the apparatus is fed to the bobbin via the traveller. The twisting and winding of the yarn is effected by the tension on the yarn due to the winding operation which causes the traveller to move at relatively high speeds about the ring. This prior structure has certain disadvantages including abrasion between the ring and the traveller which considerably shortens their lives and frequently causes the yarn to break because of increased tension that may result because of such abrasion. Moreover, the utilization of lubricants to reduce the friction between the ring and the traveller may result in soiling of the yarn. The use of the ring and traveller structure limits the maximum speed of the spinning operation since utilization of high speeds requires the traveller to be reduced in weight in order to avoid undue tension on the yarn. Reducing the weight of the traveller, however, involves the utilization of smaller components which weakens the assembly and has a questionable effect on the reduction of abrasion. In any event the ring and traveller structure substantially limits productive efficiency of the spinning apparatus.

One of the purposes of this invention is to provide a new and improved ring device which is capable of substantially increasing productive efficiency without encountering the problems of prior known systems.

Another object of the invention is to provide a new and improved spinning device that is characterized by its simplicity and the elimination of abrasion between the moving parts which has heretofore resulted in excessive tension on the yarn particularly at high speeds.

The above and other objects and advantages of the invention will become more apparent from the following description and accompanying drawings forming part of this application.

In the drawings:

FIGURE 1 is a cross-sectional view of one embodiment of the invention showing a bobbin and surrounding apparatus.

FIGURES 2A and 2B are cross-sectional and plan views, respectively, of the floating ring element of FIGURE 1.

FIGURE 3A and 3B are cross-sectional and plan views, respectively, of the stationary circular element of FIGURE 1.

FIGURES 4A and 4B are cross-sectional and plan views, respectively, of a modified floating ring.

FIGURE 5 is a cross-sectional view of another embodiment of the invention.

FIGURE 6A and 6B are plan and the cross-sectional views of a further modification of the invention.

FIGURES 7 and 8 are perspective and cross-sectional views, respectively, of still another modified embodiment of the invention.

FIGURE 9 shows the plan of still another example of ring device in accordance with the invention.

FIGURE 10 is a side view of the ring holder for use with the ring device shown in FIGURE 9.

FIGURE 11 is a side view of another form of ring holder for use with the ring device shown in FIGURE 9.

FIGURE 12 is a cross-sectional view of still another form of ring device in accordance with the invention.

FIGURE 13 and FIGURE 14 are fragmentary cross-sectional views of modified embodiments of the structure shown in FIGURE 12.

FIGURE 15 and FIGURE 16 are cross-sectional and plan views of a ring-removing device for use with apparatus in accordance with the invention, and FIGURE 17 is a perspective view showing a step in the procedure for removing a ring.

Referring now to FIGURE 1, there is illustrated a cross-sectional view of the spinning apparatus in accordance with the invention. This apparatus includes an annularly supported member 3 surrounding a central bobbin 4 on which the thread is wound. The annular frame or ring rail 3 is of non-magnetic material and supports an annular ring holder 2. The inside diameter of the ring holder 2 is substantially larger than the maximum size of the wound bobbin and has a gently inclined inner surface portion with rounded edges to avoid abrasion of the thread 5. The ring 1 rides within the ring holder 2 and has a sloping outer wall and rounded upper and lower edge portions. This ring is shown more clearly in FIGURES 2A and 2B. The outer sloping or conical edge portion 6 is relatively highly polished and the ring forms essentially part of a cone. The upper edge of the ring has a shoulder 8 formed therein for the receipt of an additional element in order to increase the weight of the ring which may be required under certain conditions. The ring is preferably made of a material that may be permanently magnetized, as, for instance, KS steel, MK steel, NKS steel, or the like, and it is magnetized in a radial direction so that the surface 6 constitutes one pole of the magnet and inner circumferential surface 7 forms the opposite pole of the magnet. The ring holder 2 is shown more clearly in FIGURES 3A and 3B and the inner surface 9 is preferably highly polished in order to avoid abrasion of the yarn. The lower edge of the ring holder 2 is under cut as indicated at 12 to fit into the annular ring rail 3 as shown in FIGURE 1. The surface 10 is essentially cylindrical although the particular configuration of this portion of the ring holder is not significant.

As in the case of the ring 1, the ring holder 2 is also formed of a magnetic material capable of being permanently magnetized and may be formed of a material similar to that of the ring 1. The ring holder 2 is polarized so that the outer surface 11 is of one polarity while the inner surface 9 is of opposite polarity and it is important that the surface 9 of the ring holder 2 has the same polarity as the surface 6 of ring 1 so that the ring 1 will tend to be repelled by the ring holder 2. The annular supporting member 3 is preferably formed of a non-magnetic material.

The ring 1 of the ring holder 2 may be magnetized in any suitable manner, as, for instance, the introduction of the ring into the annular magnetic field. It may also be desirable to rotate the ring and ring holder in the annular magnetic field in order to ensure uniform magnetization of the elements.

When the structure in accordance with the invention is assembled as shown in FIGURE 1, the ring 1 will tend to be repelled from within ring 2 and by properly controlling the weight of ring 1 and the strength of the magnetization of the rings 1 and 2, the ring 1 will tend to float in space with the magnetic force just counteracting the effect of gravity. In this way a ring shaped gap 15 is formed between the ring 1 and the ring holder 2. Should the gap 15 be too large, an added weight 13 in the form of an annular ring member, as shown in FIGURES 4A and 4B, may be utilized to obtain the desired gap size.

The bobbin 4 may be supported in any desired manner and is rotated at a selected speed depending on the character of the yarn being spun. The yarn 5 is fed from a suitable supply downwardly through the gap 15 and on to the bobbin 4. As the bobbin 4 is rotated at high speed, the yarn 5 is wound upon the bobbin and will be in constant contact with the outer circumferential surface of ring 1 and at the same time it will tend to move annularly about the gap 15. The ring 1 will freely rotate in its position during the spinning operation and the yarn will be constantly twisted as it is wound upon the bobbin 4. Should the yarn break during the operation, splicing may be accomplished by merely lifting the ring 1 from its position and tieing the broken ends of the yarn together. The ring 1 may then be replaced and spinning operation continued.

As is evident from the foregoing description, the ring 1 is effectively floated in space without any mechanical support. As a result frictional resistance and abrasion of the elements 1 and 2 are completely eliminated and lubrication is, of course, unnecessary. The elimination of lubrication avoids the possibility of soiling the yarn so a cleaner resultant product is obtained. Moreover, abrasion of the yarn and tensile stress thereon is minimized with the result that considerably higher spinning speeds may be obtained. For example, it has been found that it is possible to operate as high as 15,000 r.p.m. which is not obtainable with known systems utilizing the so-called ring and traveller constructions.

FIGURE 5 shows still another embodiment of the invention. In this figure the ring is denoted by the numeral 16 and is in the form of a toroid with a polished outer surface. The ring, as in the case of the embodiment of FIGURE 1, is made of a magnetic material capable of permanent magnetization.

This ring differs from the ring 1 of FIGURE 1 in that the ring 16 is polarized so that its upper surface 17 is of one polarity, while its lower surface 18 is at another polarity. The ring holder is denoted by the numeral 19 and is essentially cylindrical in configuration and is formed of a magnetic material capable of being permanently magnetized. The upper surface 20 of the ring 19 has one polarity while the lower surface 21 has another polarity.

A non-magnetic ring 20' overlies the inner cylindrical surface of the ring holder 19 and functions to reduce the attracting force exerted between the ring 16 and the ring holder 19. The ring 16 may be inserted within the ring 20 in any manner since the ring 16 will float within the ring holder whether the adjoining poles are of similar or different polarities. The ring 19 is supported by an annular frame 3 in the same manner as described in connection with the embodiment of the invention shown in FIG. 1.

With the arrangement described above, the magnetic forces tend to cause the ring to be retained centrally within the ring holder 19. The thread, as in the case of the embodiment shown in FIGURE 1 is brought downwardly within the gap formed between the ring 16 and the sleeve 20' and then on to the bobbin 4. This structure produces essentially the same results as that illustrated and described in connection with FIGURE 1 except that in this embodiment of the invention the ring 16 may be of lighter weight than the ring 1 of FIGURE 1 and in normal operation the ring 16 will float slightly below the center of ring 19.

It is of course desirable to magnetize the rings 16 and 19 uniformly in order to produce stable and uniform operation of the device. Some non-uniformity of magnetic force is unavoidable because of the difficulty involved in uniformly magnetizing the cooperating elements, and in certain instances, it will be found that the ring is brought into extremely close contact with the ring holder. This condition of non-uniform magnetization can be corrected by the device shown in FIGURES 6A and 6B. In these figures, the magnetic ring is denoted by the numeral 22 and corresponds to the ring 16 of FIGURE 5. The ring holder denoted herein by the numeral 23 is provided with an inner, non-magnetic sleeve 24 of non-uniform thickness. More specifically, the non-magnetic sleeve 24 has a point of minimum thickness and a diametrically opposite point of maximum thickness and the intervening portions of the sleeve are tapered gradually from minimum thickness to the point of maximum thickness. The sleeve 24 is also provided with a pair of outwardly extending ears 25 and set screws 26. These ears overlie the ring 23 as shown in FIGURE 6B so that when the set screws 26 are loosened, the sleeve 24 can be rotated to compensate for non-uniformity in the gap defined by the floating ring 22 and the inner surface of the sleeve 24. In actual practice, it has been found that when the ring 22 has an outer diameter of approximately 60 millimeters, an eccentricity of one to two millimeters will be sufficient to compensate for magnetic non-uniformity and produce a uniform spacing between the ring 22 and the sleeve 24.

Further in connection with FIGURES 6A and 6B, it will be observed that the ring 22 may have a cylindrical configuration with rounded upper and lower edges.

With the structures shown in FIGURES 5, 6A and 6B, it may be difficult to remove the ring 16 or 22, as the case may be. This difficulty may be remedied by the structure shown, for instance, in FIGURES 7 and 8. In FIGURE 7 the ring 23 is provided with notches 27 to make the ring 22, for instance, accessible and permit it to be gripped by the fingers or an appropriate tool. The openings 27, however, should be placed symmetrically about the ring 23 in order to avoid disturbance of the magnetic balance of the unit.

A modified version is shown in FIGURE 8 wherein the ring 22 carries an upper section 28 of non-magnetic material which extends above the upper surface of the ring 23. The section 28 may be formed of any suitable light material such as metal alloy or plastic.

FIGURE 9 shows still another embodiment of the invention to facilitate threading of the device without removal of the inner floating ring. The ring in this embodiment of the invention is denoted by the numeral 22 which corresponds with the floating rings of FIGURES 6, 7 and 8. The ring holder is denoted by the numeral 23 and the annular support is denoted by the numeral 31 and is preferably formed of a non-magnetic material. The ring holder 23 and annular support 31 are cut to form a passage 29 leading from the outer surface of the ring holder into the gap between the ring 22 and the ring holder 23. This gap or passage is inclined in the direction of rotation of the ring holder as indicated by the arrow thereon so that there will not be any chance of the thread catching in the passage 29. In order to maintain magnetic uniformity of the structure, a second passage or cut is formed in the ring 23 as denoted by the numeral 30. The passage 30 is diagonally opposite to passage 29, the latter having a tapered entrance to facilitate threading.

While the passages 29 and 30 are generally formed in a vertical direction, it is apparent that the passages may be sloped as shown, for instance, in FIGURE 11.

With the foregoing arrangement as described in FIG-

URES 9 to 11, the floating ring 22 need not be removed for the purpose of threading a centrally located bobbin (not shown in these figures) or for tieing broken ends of yarn together should the yarn be ruptured for any reason whatsoever.

In certain cases it may be found that the floating magnetic ring, as a result of tension caused by the traveling yarn, may tend to operate in a somewhat unstable fashion. FIGURE 12 illustrates a mode of reducing operational instability by controlling excessive vertical displacement of the magnetic ring within the cooperating ring holder. More specifically, the floating magnetic ring is denoted in FIGURE 12 by the numeral 22 and floats within the ring holder 23 by reason of magnetic forces, as previously described. In this figure let it be assumed that a magnetic attracting force is utilized and the cooperating ring 22 has a curved outer peripheral surface. In this embodiment of the invention the ring 23 is provided with a liner 34 of non-magnetic material. This liner extends substantially above the top surface of the ring 23 and is formed with an upper U-shaped section with the outer wall extending downwardly to overlie part of the upper periphery of the ring 23. Within the space 35, defined by the non-metallic member 34 there are provided a number of downwardly extending projections or tabs 36 disposed in symmetrical angular positions. Each of the supports 36 pivotally carries a downwardly and outwardly inclined rod 38 having a wheel rotatably mounted on the outer end thereof with each of said wheels having portions 41 extending beyond the inner surface of the non-metallic member 34, as illustrated, appropriate openings being formed in the walls of said non-metallic member to accommodate the wheels 40. With this arrangement, the wheels 40 are permitted to move about the supporting pivot and are spring loaded in an outer direction by a spring 37 and movement in the inner direction is limited by a stop 39.

With this arrangement, should the ring 22 operate in an unstable manner because of non-uniform tension on the yarn or for any other reason, the ring will come in contact with one or more of the wheels 40 which will prevent further deflection of the ring 22. Furthermore, contact of the wheels 40 with the ring 22 will not adversely affect the spinning of the yarn, since the wheels 40 are spring loaded and will readily permit the yarn to move between the wheel and the ring without any undue stress on the yarn. As a result, instability of the operation of the ring 22 can be eliminated.

FIGURE 13 illustrates a slightly modified construction of a stabilizer that may be used in place of the stabilizing wheel 40 of FIGURE 12. In this case the ring holder 23 is provided with a plurality of inclined openings 42 in which a tube 45 is inserted. The tube 45 contains a spring 43 and a ball 44, the latter being held within the tube 45 by slightly swaging the end of the tube. The ball 45 protrudes from the end of the tube and will contact the ring 22 should it operate in an unstable manner. Moreover, the ball 45, being free to rotate, will not produce abrasion when it contacts the ring 22, nor will it damage the yarn being spun.

FIGURE 14 shows a further modification of a stabilizer wherein the ring 22 is provided with inclined openings carrying tubes 45, the latter containing a ball 44 and spring 43.

FIGURES 15 to 17, inclusive, illustrate a tool that may be utilized for removing a floating ring, as described in the previous embodiments of the invention. In these figures the main body of the tool is denoted by the numeral 50 and has a ring-shaped portion 51 to facilitate engagement by a finger, preferably the middle finger of the hand. Within the body of the tool is a permanent magnet 56 which extends through the transverse opening 55. A slot 57 is formed in the right hand side of the tool as shown in FIGURE 15 and communicates with the opening 55.

As will be shown, this permits some flexing of the jaws 53 and 54 when gripping a ring. The jaws 53 extend from the right hand side of the body as shown in FIGURE 15 and are curved downwardly. A bottom central jaw 56 extends from the lower side of the body and curves upwardly. With this arrangement the top jaws would be placed over the top of the ring and the bottom jaws slid down beneath the ring, as illustrated in FIGURE 17. The magnet 56 is preferably polarized so that the jaws 53 and 54 will tend to attract the ring rather than repel it and this of course will facilitate picking up the ring and removing it from its position in the ring holder without marring or damaging it by the utilization of pliers or other similar tools. The tool may also be utilized for replacing a ring within the ring holder.

The tool is particularly important since the yarn will break during the spinning operation and in some instances it is necessary that the ring be removed to facilitate tieing together the broken ends of the yarn. In these instances, it is of course important that the operation be carried on most expeditiously in order to avoid unnecessary delay in the spinning operation.

While several embodiments of the invention have been illustrated and described, it is apparent that modifications, alterations and changes may be made without departing from the true scope and spirit of the invention as defined by the appended claims.

What is claimed is:

1. In spinning apparatus, a rotatably mounted bobbin, means for mounting said bobbin for rotation about a normally vertical axis, an annular support surrounding said bobbin, an annular ring holder of magnetizable material surrounding said bobbin and carried by said support with the plane of said ring holder being perpendicular to said axis, said ring holder being uniformly magnetized in an axial direction with its upper surface of one polarity and its lower surface of another polarity, a ring of magnetizable material having an outside diameter smaller than the inside diameter of the ring holder and disposed within said ring holder and forming a gap therebetween, said ring being uniformly axially magnetized in the same direction as the ring holder and with its upper surface of one polarity and its lower surface of another polarity, whereby the magnetic forces will cause said ring to float within the ring holder, said yarn to be spun being adapted to feed through the gap between the ring and ring holder and on to the bobbin.

2. Spinning apparatus according to claim 1, wherein said ring holder is provided with a layer of non-magnetic material on the inner surface thereof and said ring has an outside diameter smaller than the inside diameter of said non-magnetic surface.

3. In spinning apparatus according to claim 1, including a ring of non-magnetic material slidably carried on the inner surface of said ring holder, said ring of non-magnetic material having an inner cylindrical opening eccentrically positioned relative to the outer cylindrical wall, and means for adjustably positioning said ring of non-magnetic material relative to said ring holder.

4. Spinning apparatus according to claim 1 wherein said ring holder has a pair of oppositely disposed notches formed in one edge thereof.

5. Spinning apparatus according to claim 1 wherein said ring is formed in part of magnetic material and in part of non-magnetic material and wherein said non-magnetic material extends above the edge of the ring holder.

6. In spinning apparatus according to claim 1 wherein said ring holder has oppositely disposed slots formed therethrough and said annular support has a single slot extending therethrough and in registry with one of said ring holder slots.

7. In spinning apparatus according to claim 6 wherein said slots are formed in the direction of rotation of said bobbin.

8. In spinning apparatus according to claim 6 wherein said slots are inclined relative to the axis of the ring holder.

References Cited by the Examiner

UNITED STATES PATENTS

| | | | |
|---|---|---|---|
| 860,448 | 7/07 | Cumnock | 57—124 |
| 2,083,724 | 6/37 | Major | 57—124 |
| 2,932,152 | 4/60 | Jackson | 57—124 X |
| 3,114,234 | 12/63 | Kobayashi | 57—124 |

FOREIGN PATENTS

| | | |
|---|---|---|
| 1,024,775 | 1/53 | France. |
| 826,716 | 11/52 | Germany. |
| 26,996 | of/07 | Great Britain. |
| 534,978 | 10/55 | Italy. |

MERVIN STEIN, *Primary Examiner.*